May 29, 1956 F. S. FROST 2,747,883
HAND TRUCK WITH MULTIPLE WHEEL PAIRS
Filed Nov. 23, 1953 2 Sheets-Sheet 1

FRANK S. FROST
*INVENTOR.*
BY Daniel A. Bobis
atty

May 29, 1956 F. S. FROST 2,747,883
HAND TRUCK WITH MULTIPLE WHEEL PAIRS
Filed Nov. 23, 1953 2 Sheets-Sheet 2
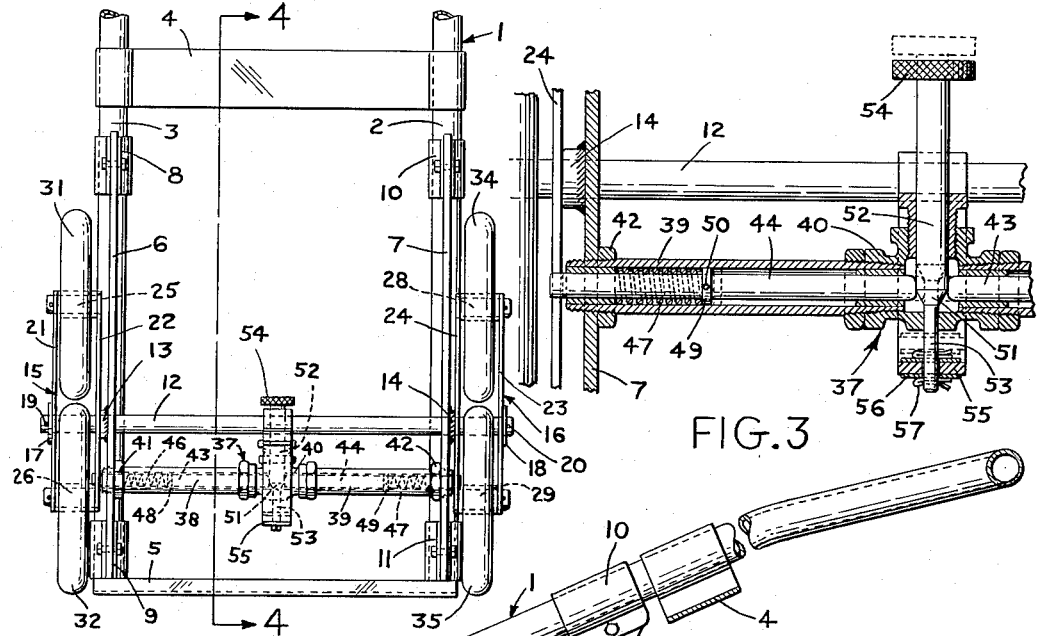
FIG. 2
FIG. 3
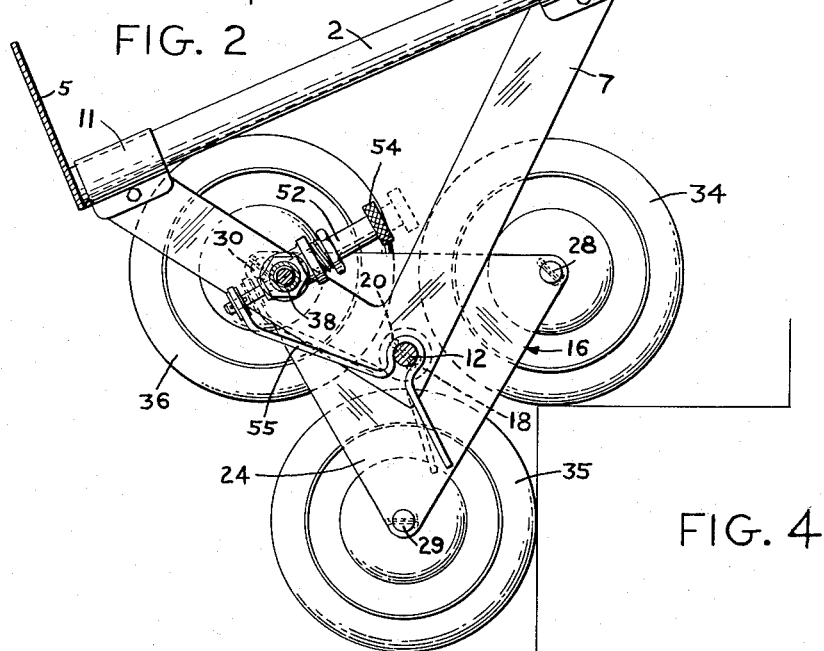
FIG. 4
FRANK S. FROST
*INVENTOR.*
BY Daniel H. Bobis
atty

United States Patent Office 2,747,883
Patented May 29, 1956

2,747,883

HAND TRUCK WITH MULTIPLE WHEEL PAIRS

Frank S. Frost, Oak Park, Ill.

Application November 23, 1953, Serial No. 393,755

1 Claim. (Cl. 280—5.26)

This invention relates to a manually movable supporting structure for baggage, packages, and the like, generally known as a hand truck which is adapted to be moved over both flat surfaces and obstacles, steps or the like.

Hand trucks for handling heavy objects such as baggage having a frame with a pair of wheels at one end and a handle at the other end are well known in the art.

It has long been a problem to provide a device for moving these hand trucks with their heavy loads over obstacles or up and down steps. It is generally known that if three or more pairs of wheels affixed about a single axis, instead of a single pair of wheels are provided, that these trucks can be lifted over obstacles by rotating the respective pairs of wheels about the axis of attachment therefor, as the truck is moved from surface to surface.

However, when the truck with this multiple wheel construction is moved over a substantially plain or flat surface, the wheels are found to interfere with each other where, for example, a loaded truck being wheeled must be changed from one direction to another.

The present invention meets this problem by providing a hand truck having multiple pairs of wheels disposed to rotate about a common axis for movement of said hand truck over different planes, angles and heights, said truck having an engaging means to limit rotation of said multiple pairs of wheels and to act as a pivot or fulcrum for the frame element of the hand truck whereby one or two pairs of wheels may be made to touch the ground as desired when the truck is being utilized on a substantially flat surface and, in addition, the frame can be tilted from a substantially vertical to a substantially horizontal position without releasing the engagement means so that the hand truck in either position may be moved to the two or four-wheel operation over flat surfaces.

Accordingly, it is an object of the present invention to provide a hand truck which is adapted to be moved on a flat surface, or over obstacles, or to be advanced up and down steps for the like type of surface.

With these and other objects in view, as may appear from the accompanying specification, the invention consists of various features of construction and combination of parts, which will be first described in connection with the accompanying drawings, showing a hand truck with multiple wheel pairs of a preferred form embodying the invention, and the features forming the invention will be specifically pointed out in the claim.

In the drawings:

Figure 2 is a rear view of the invention.

Figure 3 is an enlarged fragmentary section of the latch control in the locked position taken on the line 3—3 of Figure 1.

Figure 4 is a view taken on line 4—4 of Figure 2 showing the invention in a moving position over an obstacle such as a stair.

Figure 1:
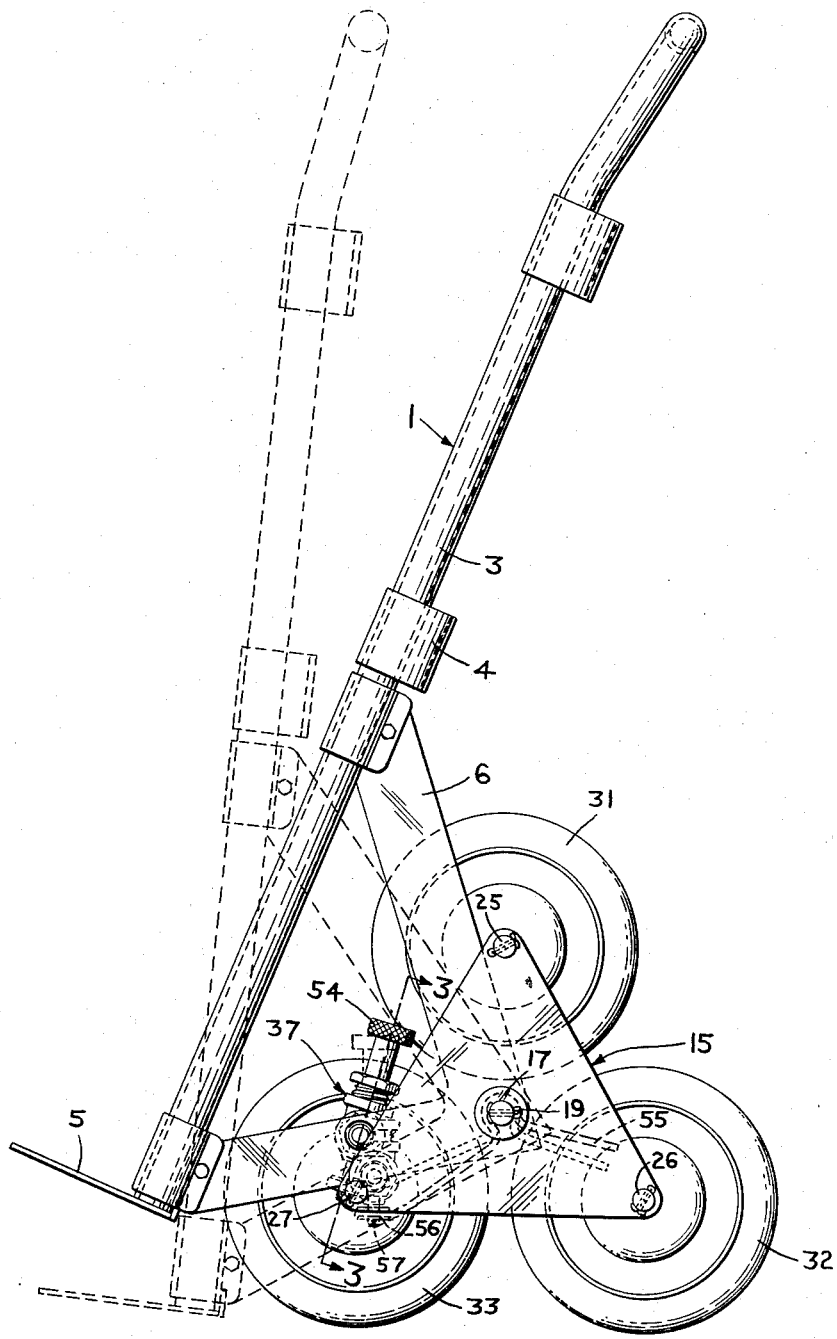
Figure 1 is a side view of the invention showing the triangular spider members in the locked position and unlocked position.

Referring more particularly to the drawings, the hand truck is shown as having a frame generally designated 1 which includes spaced tubular members 2 and 3, with at least one transverse support 4 connected across said members 2 and 3 in the medial portion thereof and a transverse lever element 5 disposed across the respective ends of the members 2 and 3. It will be understood that while tubular members are suggested that this is only illustrative and that the members may be solid, square, columns or the like type of structure sufficient for this purpose without departing from the spirit of this invention.

L-shaped bracket arms 6 and 7 are connected to the underside of the respective members 2 and 3 by suitable connecting elements 8, 9, 10 and 11 respectively so that the larger arm of each of said L-shaped brackets has its upper end connected to the respective tubular member above that of the shorter end, as is clearly shown in Figures 1 and 2 of the drawings.

Connected at the vertex of each of said L-shaped bracket members 6 and 7 transversely of the longitudinal line of the hand truck is an axle member 12 extending outwardly on either side of the tubular elements 2 and 3 through bushing elements 13 and 14 affixed at the vertex of each of the respective L-shaped brackets 6 and 7 as by welding or other means. Each of the respective extended ends of the axle member 12 will receive rotatively a pair of triangular shaped spider elements generally designated 15 and 16 which are held on the respective ends of the axis as by washer elements 17 and 18 and cotter pins 19 and 20, all of which is clearly shown in Figures 1 and 2 of the drawings.

The spider structures 15 and 16 act to support the wheels and accordingly, Figures 1, 2 and 4 show that they consist of two aligned triangularly shaped plates 21 and 22, and 23 and 24. At the respective vertices of the angles formed on the plates short axle elements 25, 26, 27, 28, 29 and 30 respectively are disposed between or across each of said pairs of spiders substantially parallel to the main axle 12 to provide means for supporting the respective wheel elements 31, 32, 33, 34, 35 and 36 thereon. It will be understood that while triangular shaped plates are illustrated that the plates might be octangular or square or have any shape for additional pairs of wheels as desired.

The spiders are adapted to freely rotate about the main axle member 12 and, accordingly, in the absence of the latch control more fully described hereinafter would when riding on a horizontal surface have a total of four wheels, two on either side, acting to touch the surface over which the hand truck was being used. The latch control hereinafter described, act in two ways: first, to limit the rotatory movement of the spider and, second, to act as a fulcrum for the frame so that the forward movement thereof will exert leverage through the axle member 12 and tilt the hand truck onto a single set of wheels. This allows for ease in turning the hand truck, and the frame can by a relatively small movement thereof about the axle 12 act by backward and forward motion to move the truck onto two or four-wheeled operation as desired, over a flat surface without releasing the latch control.

Latch control for spiders

The latch control for the spiders generally designated 37, is shown in Figure 2 as having a pair of hollow sleeve elements 38 and 39 disposed transversely of the longitudinal line of the truck frame 1 substantially parallel to the main axle 12. The respective inner ends of the sleeve elements 38 and 39 are connected to opposite sides of a T-member 40 and their respective outer ends remote from said inner ends extend through the shorter leg of the L-shaped brackets 6 and 7 adjacent to the outer ends which allows locking nuts 41 and 42 to be threaded on said outer ends to hold the respective sleeves in the desired positions on said L-shaped brackets.

The latch control includes rods 43 and 44 slightly larger than the respective sleeve elements 38 and 39 in which they are slidably mounted so that they extend through the outer open end thereof past the respective outer peripheries of the inner plates 22 and 24 to act as stop members as is hereinafter described, all of which is clearly shown in Figures 1 and 3 of the drawings.

The horizontal rods 43 and 44 are rounded on their inner ends and extend into the T-member 40 for contact with the cam surface 51 of an actuating pin 52 slidably disposed therein substantially parallel to the longitudinal line of the truck frame 1. The rods are normally held out of engagement with the outer periphery of the inner plates 22 and 24 by spring members 46 and 47 disposed in the sleeve elements and mounted about the horizontal rods 43 and 44. The spring members 46 and 47 are held in position in the respective sleeves 38 and 39 by bushing elements at one end thereof and transverse washer elements 48 and 49 at the other end thereof which are keyed or pinned as at 50 to the horizontal rods 43 and 44 all of which is clearly shown in Figures 2 and 3 of the drawings.

The actuating pin 52 is an elongated rod-like member having a main body portion connected and formed integrally with a projection or nose portion 53 in the axial line thereof of reduced cross-section so that the camming surface 51 is formed therebetween. The main body portion of the actuating pin 52 extends outwardly of the T-member 40 at the upper end thereof to receive a ferruled end 54 as a stop element and for contact with the foot of the operator. At the lower end the projection or nose portion 53 extends outwardly of the T-member 40 to connect to one end of a lever 55 having its fulcrum pivotally disposed on the main axle 12, all of which is clearly shown in Figures 1 and 3 of the drawings.

Figures 1, 2 and 3 show that the lever 55 is connected by means of a washer element 56 and cotter pin 57 to the projection or nose portion 53 so that when the end remote from the connected end is pushed with the foot of the operator the actuating pin 52 can be moved upwardly.

*Operation*

In operation, if the truck is on a horizontal surface as above described, four wheels, two on either side will touch the ground. By tilting the frame 1 rearwardly about the axle 12 the knurled or ferruled end 54 of the rod 52 may be moved inwardly with the foot to force by action of the cam surface 51 thereof on the inner ends of the horizontal rods 33 and 34 the outer ends of said horizontal rods beyond the outer periphery of the inner plates 22 and 24 respectively of the spider elements 15 and 16, as is clearly shown by the solid lines in Figure 1 of the drawings. The effect of forcing the horizontal rods outwardly is to create stops which limit the rotatory movement of the spiders 15 and 16 and simultaneously to function as a fulcrum thereagainst. If the frame 1 is now tilted forward and then back, the rear pair of wheels are caused to lift and return to the surface over which the hand truck is being moved. Thus, all that is required to allow the hand truck to function as any other two-wheeled truck is to tilt the frame forward in the position as shown in Figure 1.

In addition, however, by reason of the fact that the horizontal rods 43 and 44 engage only the periphery of spider elements 15 and 16, the frame 1 is free to swing from almost a substantially vertical position to a substantially horizontal position before the rods 43 and 44 will reengage the periphery of the spiders 15 and 16 at a new point thereon in the arc of rotation of the frame spaced from the original point of peripheral contact thereon. Two-wheeled operation can be similarly obtained in the horizontal position when the horizontal rods operate as a fulcrum by backward and forward movement of the frame to now lift the forward set of wheels and return them to the surface over which the hand truck is being moved.

Thus the truck in this position in which the horizontal rod elements act as stops can be operated as any other two-wheeled truck. However, if it is desired to go up and down stairs or over obstacles, by pressing the lever member 55 with the foot, the operator releases the actuating pin 52 so that the inner ends of the horizontal rods 43 and 44 can be moved inwardly by expansion of the spring elements 46 and 47. This frees the spider elements and each of the wheels may be rotated about the main axle and hence the truck is adapted for movement over obstacles or up and down stairs.

It will be understood that while this hand truck is illustrated as a practical and commercially useful device, it is also adapted to be modified in strength and size so that it can be utilized as an interesting and instructive toy for children.

It will be understood that the invention is not to be limited to the specific construction or arrangement of parts shown but that they may be widely modified within the invention defined by the claim.

What is claimed is:

A hand truck adapted to be moved over flat surfaces and obstacles comprising, a main axle, a frame on said axle movable in an arc about said axle, wheel supporting members rotatably mounted on each end of the axle, at least three wheels mounted in equally spaced relation on each of said wheel supporting members, and means rotatable with said frame including spaced rods disposed to move in opposite directions substantialy parallel to said main axle, spring members to hold said horizontal rods out of engagement with said wheel supporting members, a latch member including a pin having a cam surface, said cam surface to coact and engage said rods on their inner ends on downward movement thereof to move said rods into said releasable engagement with the periphery of said wheel supporting members at two spaced points in the arc of movement of said frame, said means and frame adapted to coact at each of said points of contact whereby movement of said frame will allow only one wheel on either side of the frame to touch the surface of movement, and a lever member to move said pin outwardly to allow said springs to actuate the rods out of engagement with said wheel supporting members to allow the same to rotate freely.

References Cited in the file of this patent

UNITED STATES PATENTS

| | | |
|---|---|---|
| 255,693 | Tauber | Mar. 28, 1882 |
| 416,846 | Messinger | Dec. 10, 1889 |
| 482,708 | Watkins | Sept. 13, 1892 |
| 843,034 | Ridgway et al. | Feb. 5, 1907 |
| 849,270 | Schafer et al. | Apr. 2, 1907 |
| 932,330 | Rotchford | Aug. 24, 1909 |
| 1,641,371 | Carlson | Sept. 6, 1927 |
| 2,706,640 | Marshall | Apr. 19, 1955 |

FOREIGN PATENTS

| | | |
|---|---|---|
| 134,173 | Great Britain | Oct. 30, 1919 |